Figure 2:
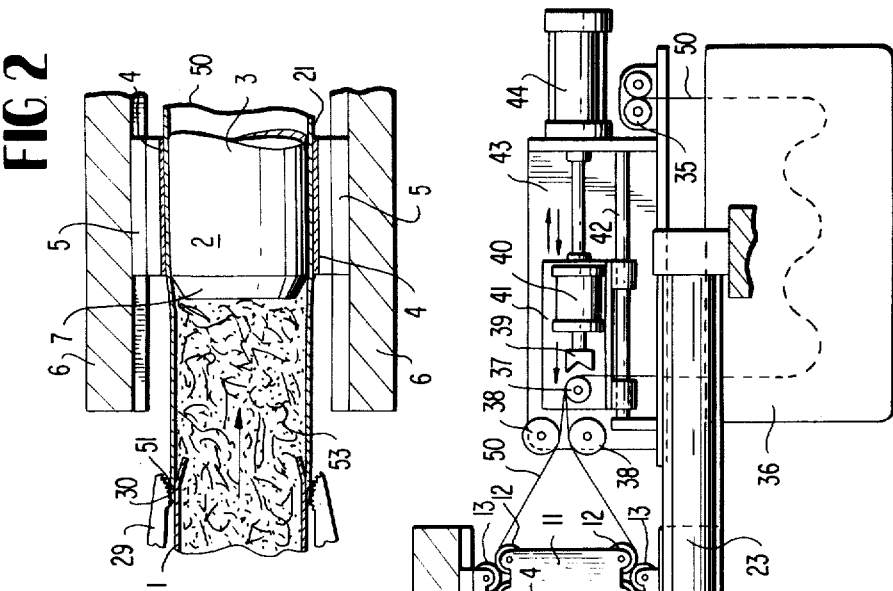

United States Patent

Kawai

[11] 3,919,739
[45] Nov. 18, 1975

[54] METHOD AND APPARATUS FOR AUTOMATIC PRODUCTION OF STUFFED MEAT

[75] Inventor: Keiichi Kawai, Amagaski, Japan

[73] Assignee: Futaba Denki Kogyo Kabushiki Kaisha, Japan

[22] Filed: Mar. 8, 1974

[21] Appl. No.: 449,450

[30] Foreign Application Priority Data
Mar. 10, 1973 Japan............ 48-28331

[52] U.S. Cl. ............ 17/33; 17/35; 17/38; 17/49; 53/124 E; 100/DIG. 10; 141/314
[51] Int. Cl.² .................. A22C 11/00
[58] Field of Search ....... 17/33, 34, 35, 38, 49, 17/1 F, 45; 53/124 TS, 124 E; 141/313, 314; 100/DIG. 10

[56] References Cited
UNITED STATES PATENTS

| | | | |
|---|---|---|---|
| 1,366,183 | 1/1921 | Hottmann | 17/33 |
| 2,703,671 | 3/1955 | Kindseth | 141/75 |
| 2,847,805 | 9/1958 | Robbins | 53/24 |
| 3,140,735 | 7/1964 | Windle et al. | 141/314 |
| 3,391,719 | 7/1968 | Pavia | 17/35 |
| 3,451,098 | 6/1969 | Myles et al. | 17/35 |
| 3,694,853 | 10/1972 | Grieder | 17/33 |
| 3,777,331 | 12/1973 | Falborg | 17/38 |

Primary Examiner—Louis G. Mancene
Assistant Examiner—James D. Hamilton
Attorney, Agent, or Firm—Craig & Antonelli

[57] ABSTRACT

A casing in the form of a continuous band is carried by a carrier guided along an elongated frame extending from a point adjacent to the filling nozzle of a meat extruder. The casing is held on the filling nozzle while the carrier is returned to its starting position, during which meat is extruded into the casing. When the predetermined quantity of meat has been extruded, the continuous casing is cut away from the subsequent portion, and both open ends thereof are automatically fastened into a cased meat such as sausage.

27 Claims, 9 Drawing Figures

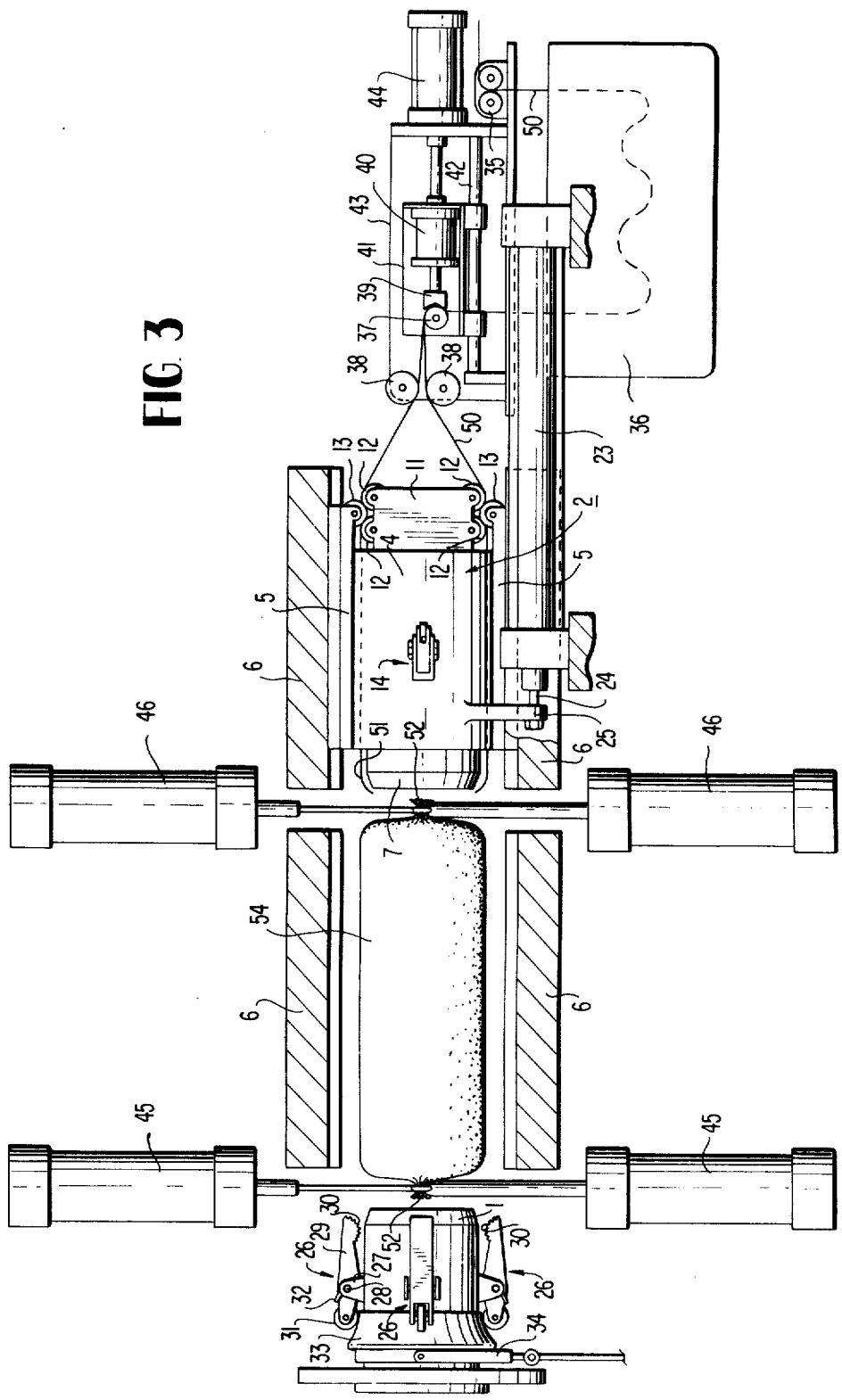

METHOD AND APPARATUS FOR AUTOMATIC PRODUCTION OF STUFFED MEAT

This invention relates to methods and apparatus adapted for the automatic production of stuffed meat such as sausages. More particularly, the present invention relates to methods and apparatus for automatically stuffing fresh meat not in a ground and pasty state into casings of relatively thick material.

When fresh meat of such nature is to be stuffed into casings, a relatively large internal pressure is exerted upon the inside wall surfaces thereof, unlike the case of ground and pasty meat. Accordingly, it is required that the casing should be of sufficient strength to withstand internal pressure against a possible tearing and breaking. For this reason, special synthetic casings of relatively thick wall are deliberately selected and used for stuffing fresh meat in a rather mass state therein.

Conventionally the stuffing of meat not in the ground and pasty state is manually performed. Initially, short tubular casings are cut in a predetermined length, and the individual casings are subsequently applied to the filling nozzle of an extruding machine by hand, so as to receive a measured quantity of meat therein. After they are shaped, both open ends of each casing are bound with strings by hand.

Accordingly, it is an object of the present invention to provide a method and stuffing apparatus which avoids the shortcomings and drawbacks encountered in the prior art.

Another object of the present invention resides in an improved method and apparatus for stuffing fresh meat not in a ground and pasty state into relative thick casings which is adapted for automatic production of stuffed meat such as sausages or the like.

A further object of the present invention resides in providing a method and apparatus for stuffing fresh meat which requires a minimum of manual labor.

According to the present invention, a casing is carried by a carrier along a guiding frame, wherein the casing is continuous from the subsequent portion of supply, the guiding frame being extended from the filling nozzle of a meat extruder through the supply path of casing. When the casing reaches the filling nozzle, it is temporarily held on the nozzle with the forward open end thereof being extended over the peripheral surface of the nozzle, thereby enabling the casing to receive meat from the extruder. When the carrier is being returned to its starting position while leaving behind the casing on the filling nozzle, a predetermined quantity of meat is extruded through the nozzle into the casing. After the casing is filled up with the given quantity of meat, it is cut away from the subsequent portion of supply, and the open ends thereof are automatically fastened into a cased meat.

According to one embodiment of the present invention the carrier is adapted to be selectively displaced along the guiding frame by selectively actuable pneumatic means.

In a futher embodiment of the present invention the carrier is constructed of para-magnetic material and is selectively displaced along the guiding frame by a chain driven magnetic means.

Figure 1:
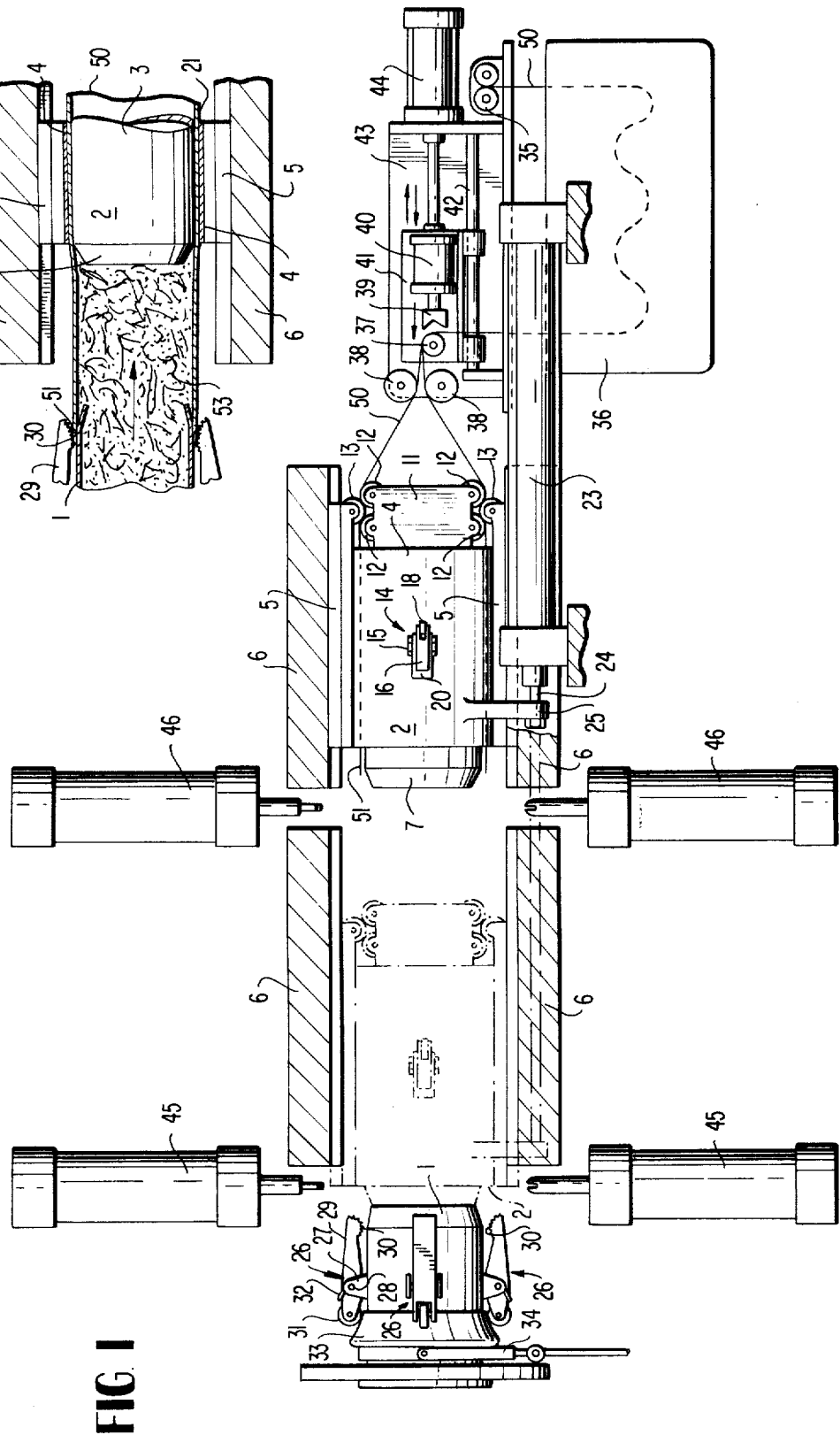
Figure 4:
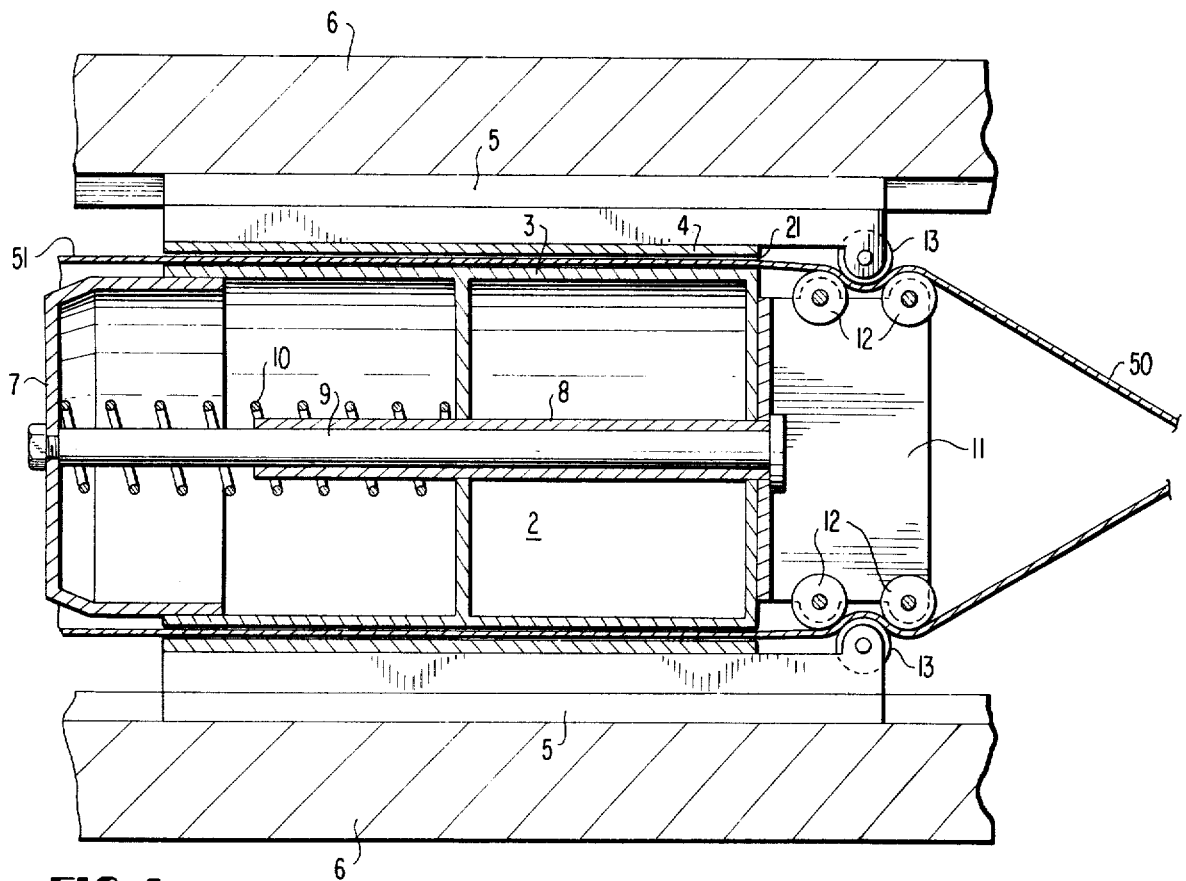
Figure 5:
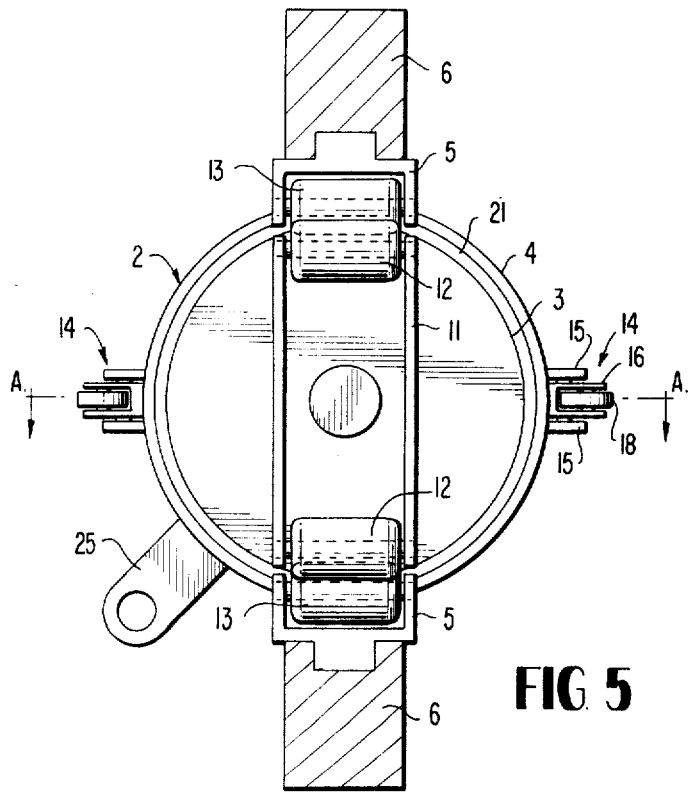
Figure 6:
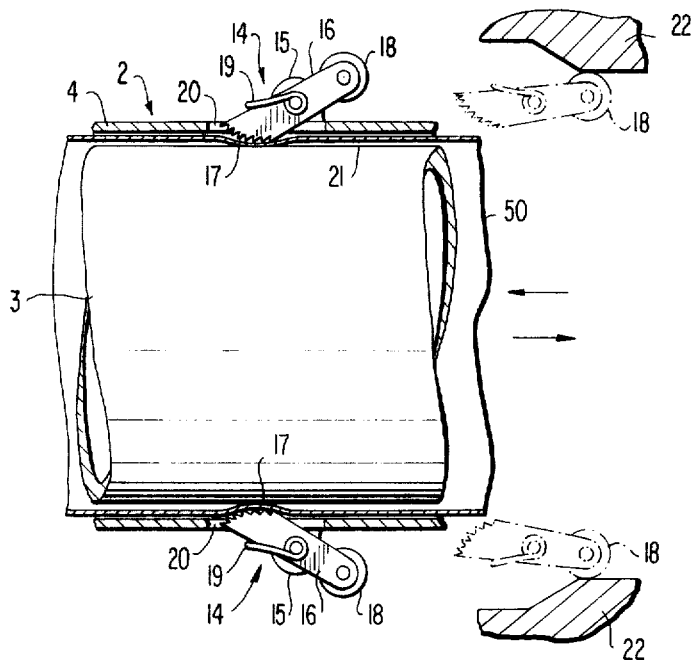
Figure 7:
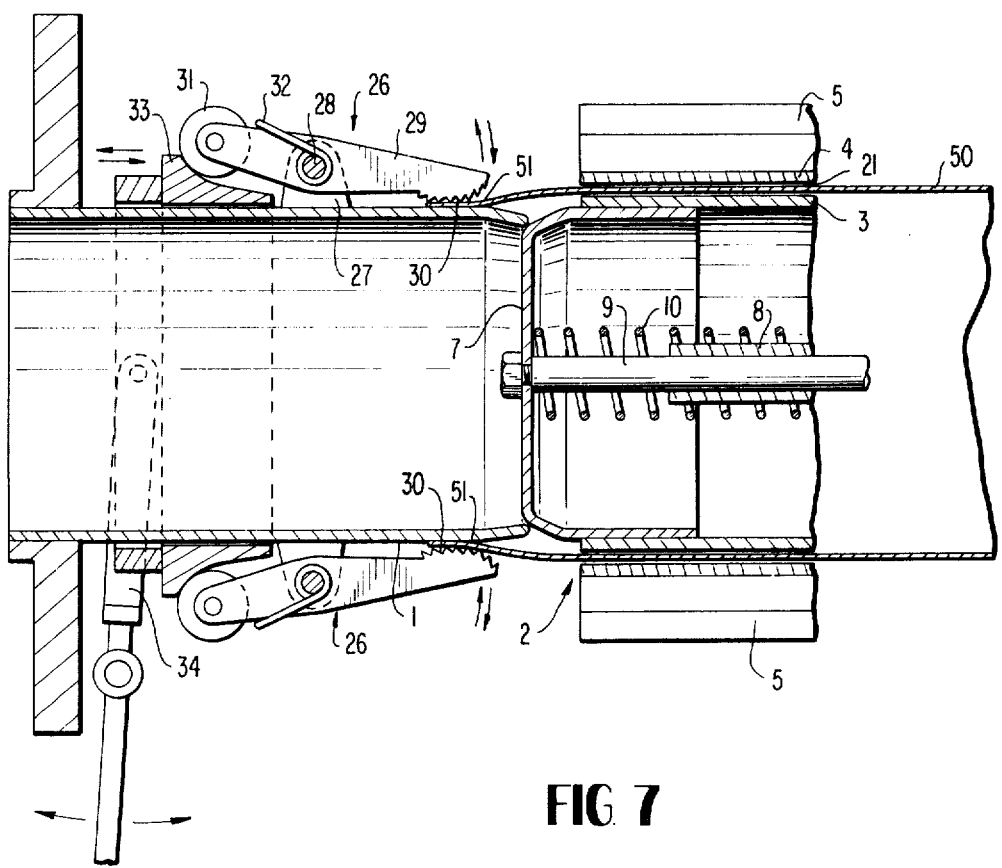
Figure 9:
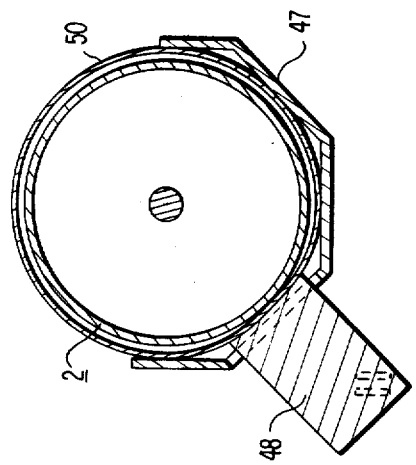
Figure 8:
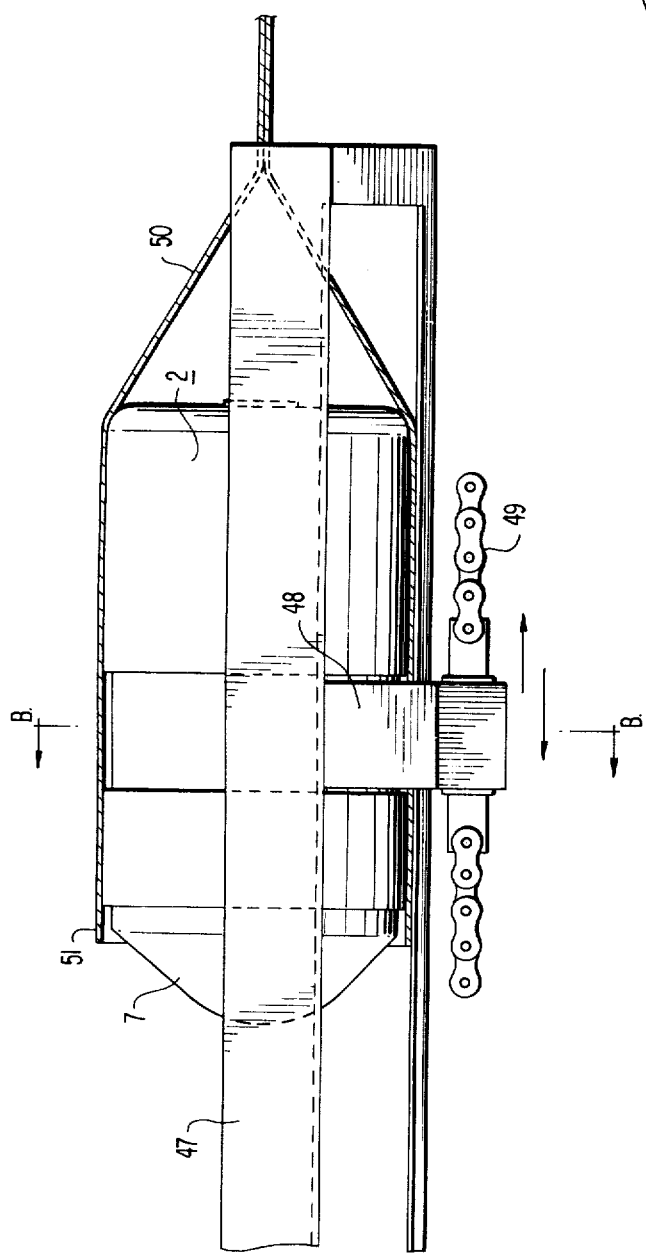

These and other objects, features and advantages of the present invention will be more particularly described by way of example, with reference to the accompanying drawings, in which:

FIG. 1 is a partial sectional view of an apparatus according to the present invention, FIG. 2 is a transverse cross-section of the carrier of apparatus illustrated in FIG. 1, particularly showing the filling operation through the nozzle into a casing carried by the carrier, FIG. 3 is a partial sectional view of the apparatus illustrated in FIG. 1 when the stuffing of meat is finished, FIG. 4 is a transverse cross-section of the carrier carrying a casing, FIG. 5 is a right-hand side view of the carrier illustrated in FIG. 4, FIG. 6 is a cross-section of the carrier illustrated in FIG. 5, taken along the line A—A therein, FIG. 7 is a transverse cross-section showing the relationship between the filling nozzle and the carrier, FIG. 8 is a side view partly in section of a further embodiment of the carrier carrying a casing, FIG. 9 is a cross-section of the modified carrier illustrated in FIG. 8, taken along the line B—B therein.

Referring now to the drawings wherein like reference numerals are used throughout the various views to designate like parts, and more particularly to FIG. 1, a carrier 2 carrying a casing 50 is mounted on a suitable base so as to move to and from the filling nozzle 1 of a meat extruder. The carrier 2 consists mainly of an inner cylinder 3 and an outer cylinder 4 with a gap 21 interposed therebetween.

The outer cylinder 4 includes axially elongated projections 5 on its top and bottom surfaces, which projections are engaged in rails 6 extended from the filling nozzle 1 through the travelling path of the carrier 2.

The inner cylinder 3 includes a head 7 secured to a spindle 9 passed through a sleeve 8 therein. The head member 7 is normally biased to a projected position beyond the end of the inner cyliner 3 by means of a spring 10 housed in the inner cylinder 3. In the rear end of the inner cylinder 3, there is provided a bracket 11 on which, adjacent to the upper and lower edges thereof, a pair of rollers 12 are carried.

The pair of rollers 12 are engaged by their mating rollers 13 carried on the elongated projections 5, whereby axial displacement of the inner and outer cylinders 3 and 4 is prevented thereby ensuring the unitary movement of the two cylinders 3 and 4.

As best illustrated in FIGS. 5 and 6, the outer cylinder 4 is provided with a stop unit generally designated by the reference numeral 14 on the outside surface thereof. In the embodiment illustrated, a pair of stop units 14 are mounted on opposite surfaces of the outer cylinder 4.

As shown in FIG. 6, the stop unit 14 includes supporting elements 15 secured to the spherical surface of the outer cylinder 4. An arm 16, pivoted on each of the supporting elements 15, is provided with teeth 17 at its tail portion and, at its top portion, with a roller 18. A spring 19 is provided to bias the teeth 17 downwardly until they are engaged with the outside surface of the inner cylinder 3 through slits 20. This prevents the casing 50 from advancing in the right-hand direction in FIGS. 4 and 6, and allowing the same to run only in the left-hand direction, when the carrier 2 is driven to carry the casing 50.

As shown most clearly in FIGS. 5 and 6, the gap 21 provided between the two cylinders 3 and 4 is maintained by the toothed portion 17 of the stop unit 14 which is forcibly oppressed onto the outside surface of the inner cylinder 3, and additionally, by the engagement of the rollers 12 and 13.

As shown in FIG. 6, a pair of fixed cam plates 22 are provided in the travelling path of the carrier 2; for example, they are located in the neighborhood of the stop unit 14 indicated in FIG. 1. When the carrier 2 is returned in the right-hand direction in FIG. 6, the rollers 18 of the arms 16 are engaged by the cam plates 22, thereby enabling the arms 16 to swing in the clockwise direction. As a result, the toothed portions 17 are separated from the outside surfaces of the inner cylinder 3, thereby releasing the casing 50 from the teeth 17.

As shown most clearly in FIGS. 1 and 3, the carrier 2 is driven by a pneumatic cylinder 23, whose piston rod 24 is fastened to a supporting projection 25 provided on the outer cylinder 4. Around the filling nozzle 1, there are four holder units 26 angularly spaced for holding the casing 50 extended on the nozzle.

Each holder unit 26 includes supporting elements 27, an arm 29 pivoted on the supporting elements by means of a pivot 28, the arm including a toothed portion 30 at its top portion and a roller 31 at its tail portion, and a spring 32 intended to bias the toothed portion 30 away from the outside surface of the filling nozzle 1. In the rear of the holder unit 26, there is provided a cam ring 33 slidably fitted on the nozzle body. When the cam ring 33 is biased by a shifter mechanism 34 towards the roller 31 of the holder unit 26, the toothed portion 30 is engaged on the outside surface of the nozzle 1.

As shown in FIG. 1, the casing 50 in the form of a band is passed between pin rollers 35, during which small openings are produced therein. Subsequently, the casing 50 is passed through a water tank 36, so as to dampen the casing 50 for giving smoothness on the surface thereof. Finally, the casing 50 is conveyed upon the carrier 2 as it is guided by rollers 37 and 38.

After the casing 50 of band form has been passed between the rollers 37 and 38, its terminating end 51 is opened and inserted between the rollers 12 and 13 as it is extended to cover up the inner cylinder 3, and is finally protruded slightly beyond the carrier 2 as illustrated in FIG. 3, with the teeth 17 of the stop unit 14 biting the casing 50 on the inner cylinder 3 (FIG. 6).

The roller 37 is engaged by a pusher 39, which is secured to the piston rod of a pneumatic cylinder 40, and the roller 37 and the pneumatic cylinder 40 are mounted as a unit on a frame 41 capable of sliding along a guiding bar 42. The movement of the frame 41 is effected by a further pneumatic cylinder 44 secured to a stationary frame 43. When the pusher 39 is placed into engagement with the roller 37 with the casing 50 interposed therebetween (FIG. 3), the frame 41 is shifted in the right-hand direction by means of the pneumatic cylinder 44, thereby pulling the casing 50 in the same direction. The purpose of this operation is to straighten the casing already stuffed with meat, and in so doing, permitting the escape of air confined therein out of the casing, which will be referred to hereinbelow.

As shown in FIGS. 1 and 3 automatic binding and cutting devices 45, 46 are provided for selectively closing, cutting and binding the open ends of the casing 50 in a manner more clearly set forth hereinbelow.

The operation of the apparatus according to the present invention is as follows:

The carrier 2 is started to advance in the left-hand direction from the position indicated in FIG. 1 by the actuation of the pneumatic cylinder 23, whereby the casing 50 held on the inner cylinder 3 by the stop unit 14 is carried to the filling nozzle 1. When the head 7 of the carrier 2 comes into abutment with the open end of the nozzle 1 as best illustrated in FIG. 7, the head 7 is pushed back against the spring 10, thereby enabling the protruded terminating end 51 of the casing to ride on the filling nozzle 1 as illustrated in FIG. 7. At this moment, the shifter mechanism 34 is actuated by suitable conventional means (not shown) so as to shift the cam ring 33 in the right-hand direction (FIG. 7), whereby the arm 29 of the holder unit 26 is swung in the clockwise direction to catch the protruded end portion 51 of the casing 50 with the toothed portion 30 thereof. In this situation, a predetermined quantity of meat is extruded into the casing through the filling nozzle, whereas the carrier 2 is gradually moved backwards i.e. away from the filling nozzle 1 under the extruding pressure, with the casing 50 being held by the holder unit 26 on the filling nozzle as clearly shown in FIG. 2. Additionally, the backward movement of the carrier may be assisted by the actuation of the pneumatic cylinder 23.

After the carrier 2 has returned to its starting position (FIG. 1), the shifter mechanism 34 is once again actuated to release the protruded end portion 51 of the casing 50 from the toothed portion 30 of the holder unit. The automatic cutting and binding device 45 is then actuated to wring up the open protruded end portion 51 with a substantially U-shaped clip 52 as illustrated in FIG. 3. The end flap of the filled casing 50 is cut away.

Subsequently, the second automatic cutting and binding device 46 is actuated to perform in the same manner with respect to the other open end portion 51 of the casing 50, in the course of which the pneumatic cylinders 40 and 44 are actuated so as to pull back the casing 50 in the right-hand direction as described above. Thus, the casing 50 containing disorderly stuffed meat is shaped, and the entrapped air is permitted to escape therefrom. At this stage, the casing 50 has been already released from the stop unit 14 by means of the cam plate 22, so that no obstruction exercises upon the pulling-back of the casing.

When the performance of the second automatic cutting and binding 46 is finished, the finished casing 54 (FIG. 3) is transfered by a suitable means (not shown) to the subsequent process, and the pneumatic cylinders 40 and 44 are de-energized, whereby the condition of the apparatus is restored to that illustrated in FIG. 1. In this way, the same procdure will be repeated.

In a further embodiment illustrated in FIGS. 8 and 9, the carrier 2 is made up of a single cylinder of magnetizable material, and is caused to travel to and fro in an elongated guiding framework 47, which is extended from a point adjacent to the filling nozzle 1 through the travelling path of the carrier 2. The reciprocating movement of the carrier to and from the filling nozzle 1 is effected under the magnetism provided by an electromagnet 48, which is travelled by means of a suitable power transmission device, such as chain drive arrangement 49.

The chain drive arrangement 49 is disposed parallel to the guiding framework 47. When the electromagnet 48 is energized by suitable means (not shown), it is attracted by the carrier 2 with the casing 50 interposed therebetween. In this situation, the electromagnet 48 is driven by the chain drive arrangement 49, whereby the carrier 2 is caused to follow together with the casing 50. After the casing 50 has reached the filling nozzle 1, the same procedure follows in stuffing meat therein. When the stuffing of meat is finished, the electromagnet 48 is de-energized and returned to its starting position by the chain drive arrangement 49, leaving behind the casing caught on the filling nozzle 1. In this embodiment, the casing can be simplified, thereby resulting in the reduced costs.

As evident from the foregoing, according to the present invention, casings can be supplied in the form of a continuous band from a reel, and meat can be automatically stuffed in those casings one after another, thereby eliminating the necessity for manual work, such as cutting short casings. Also the difficulty in stuffing meat into casings under the manual method has been solved. Thus, a great advantage of this invention is that labor required for producing stuffed foods will be minimized.

While I have shown and described two embodiments in accordance with the present invention, it is understood that the same is not limited thereto but is susceptible of numerous changes and modifications as known to those skilled in the art. Consequently, I do not wish to be limited to the details shown and described herein but intend to cover all such changes and modifications as are encompassed by the scope of the appended claims.

What I claim is:

1. An arrangement for the automatic production of stuffed meats in a continuous band casing comprising:
   a meat extruder having a filling nozzle means;
   a casing supply means;
   carrier means for carrying at least a portion of the continuous band casing from said supply means to said filling nozzle means;
   means for selectively advancing said carrier means toward said filling nozzle means; and
   means provided on said carrier means for spreading an open end of the continuous band casing on said filling nozzle means when said carrier means is disposed adjacent said filling nozzle means, said spreading means including a head member displaceably mounted in said carrier means, said head member having an extended position extending beyond the end of said carrier means and a retracted position in said carrier means, means for normally biasing said head member into said extended position, said head member being displaced into said retracted position by engagement with said filling nozzle means as said carrier means is advanced toward said filling nozzle means.

2. An arrangement according to claim 1, wherein means are provided on said carrier means for selectively maintaining said casing thereon as said carrier means is advanced toward said filling nozzle means.

3. An arrangement according to claim 2, wherein means are provided on said filling nozzle means for selectively holding said casing thereon.

4. An arrangement according to claim 3, further comprising means for automatically closing and cutting the continuous band casing into a cased stuffed meat.

5. An arrangement according to claim 4, wherein a guiding frame means is provided extending substantially from said casing supply means to said filling nozzle means, and wherein means are provided for mounting said carrier means on said guiding frame means.

6. An arrangement according to claim 5, wherein said guiding frame means includes a pair of spaced rail portions, said mounting means including projections provided on said carrier means engageable in said spaced rail portions.

7. An arrangement according to claim 5, wherein a pair of means for automatically closing and cutting the continuous band casing are provided, each of said pair including a first and second element disposed above and below said guiding frame means, said pair of means being spaced along said guiding frame means at a distance corresponding substantially to the length of the cased stuffed meat.

8. An arrangement according to claim 4, wherein said carrier means includes a pair of cylinders, one of said pair of cylinders being disposed within the other of said pair of cylinders, and wherein means are provided for maintaining a predetermined gap between said pair of cylinders.

9. An arrangement according to claim 8, wherein means are provided for preventing axial displacement of the inner and outer cylinders.

10. An arrangement for the automatic production of stuffed meats in a continuous band casing comprising:
    a meat extruder having a filling nozzle means;
    a casing supply means;
    carrier means for carrying at least a portion of the continuous band casing from said supply means to said filling nozzle means, said carrier means includes a pair of cylinders, one of said pair of cylinders being disposed within the other of said pair of cylinders;
    means for maintaining a predetermined gap between said pair of cylinders;
    means for selectively advancing said carrier means toward said filling nozzle means;
    means provided on said carrier means for spreading an open end of the continuous band casing on said filling nozzle means when said carrier means is disposed adjacent said filling nozzle means;
    means for selectively maintaining said casing on said carrier means as said carrier means is advanced toward said filling nozzle means, said means for maintaining the casing on said carrier means includes at least one support means disposed on said carrier means, an arm means pivotally mounted on said support means, said arm means including a toothed means on one end thereof selectively engageable with the casing, the other end of said arm means being provided with a roller means;
    a cam means along the path of advancement of said carrier means, said cam means being engageable with said roller means on said arm means to cause selective displacement of the same whereby said toothed means is brought into selective engagement with the casing;
    means for selectively holding said casing on said filling nozzle means; and
    means for automatically closing and cutting the continuous band casing into a cased stuffed meat.

11. An arrangement according to claim 10, wherein a pair of support means having arm means pivotally mounted thereon are provided, said support means being disposed on diametrically opposed portions of the outer cylinder of said pair of cylinders.

12. An arrangement according to claim 10, wherein said means for selectively holding the casing on said filling nozzle means includes at least one support means disposed on said nozzle means, an arm means pivotally mounted on said support means, said arm means including a toothed means on one end thereof selectively engageable with the casing, the other end of said arm means being provided with a roller means, and wherein a cam means is provided engageable with said roller means on said arm means to cause selective displacement of the same whereby the toothed means is brought into selective engagement with the casing.

13. An arrangement according to claim 12, wherein said means for spreading the open end of the casing includes a head portion disposed in said carrier, said head portion being diplaceable from an extended position beyond the end of said carrier means to a retracted position, and means disposed in said carrier means for normally biasing said head portion into said extended position whereby said head portion assumes said retracted position in response to its engagement with said filling nozzle means as said carrier means is advanced toward said filling nozzle means.

14. An arrangement for the automatic production of stuffed meats in a continuous band casing comprising:
 a meat extruder having a filling nozzle means;
 a casing supply means;
 carrier means for carrying at least a portion of the continuous band casing from said supply means to said filling nozzle means, said carrier means includes a pair of cylinders, one of said pair of cylinders being disposed within the other of said pair of cylinders;
 means for maintaining a predetermined gap between said pair of cylinders;
 means for selectively advancing said carrier means toward said filling nozzle means;
 means for spreading an open end of the continuous band casing on said filling nozzle means when said carrier means is disposed adjacent said filling nozzle means, said means for spreading the open end of the casing includes a head portion disposed in said carrier means, said head portion being displaceable from an extended position beyond the end of said carrier means to a retracted position, means disposed in said carrier means for normally biasing said head portion into said extended position whereby said head portion assumes said retracted position in response to its engagement with said filling nozzle means as said carrier means in advanced toward said filling nozzle means;
 means on said carrier means for selectively maintaining said casing thereon as said carrier means is advanced toward said filling nozzle means;
 means on said filling nozzle means for selectively holding said casing thereon; and
 means for automatically closing and cutting the continuous band casing into a cased stuffed meat.

15. An arrangement for the automatic production of stuffed meats in a continuous band casing comprising:
 a meat extruder having a filling nozzle means;
 a casing supply means;
 a carrier means for carrying at least a portion of the continuous band casing from said supply means to said filling nozzle means, said carrier means includes a pair of cylinders, one of said pair of cylinders being disposed within the other of said pair of cylinders;
 means for maintaining a predetermined gap between said pair of cylinders;
 means for selectively advancing said carrier means toward said filling nozzle means;
 means provided on said carrier means for spreading an open end of the continuous band casing on said filling nozzle means when said carrier means is disposed adjacent said filling nozzle means;
 means on said carrier means for selectively maintaining said casing thereon as said carrier means is advanced toward said filling nozzle means,
 means on said filling nozzle means for selectively holding said casing thereon, said means for selectively holding the casing on said filling nozzle means includes at least one support means disposed on said nozzle means, an arm means pivotally mounted on said support means, said arm means including a toothed means on one end thereof selectively engageable with the casing, the other end of said arm means being provided with a roller means;
 a cam means engageable with said roller means on said arm means to cause selective displacement of the same whereby said toothed means is brought into selective engagement with the casing.

16. An arrangement according to claim 15, wherein a plurality of support means having arm means pivotally mounted thereon are provided, said support means being equiangularly disposed on said filling nozzle means.

17. An arrangement according to claim 15, wherein means are provided for selectively displacing said cam means.

18. An arrangement according to claim 17, wherein said cam means includes a ring member disposed on said filling nozzle means.

19. An arrangement according to claim 8, wherein said means for selectively advancing said carrier means includes a pneumatic cylinder operatively connected to said carrier means.

20. An arrangement for the automatic production of stuffed meats in a continuous band casing comprising:
 a meat extruder having a filling nozzle means;
 a casing supply means;
 carrier means for carrying at least a portion of the continuous band casing from said supply means to said filling nozzle means;
 means for selectively advancing said carrier means toward said filling nozzle means;
 means provided on said carrier means for spreading an open end of the continuous band casing on said filling nozzle means when said carrier means is disposed adjacent said filling nozzle means;
 means on said carrier means for selectively maintaining said casing thereon as said carrier means is advanced toward said filling nozzle means;
 means on said filling nozzle means for selectively holding said casing thereon; and
 means for automatically closing and cutting the continuous band casing into a cased stuffed meat;
 said casing supply means includes a fluid tank means, a first roller means for directing the continuous band casing into said fluid tank means, a second roller means for directing the continuous band casing from said fluid tank means to said carrier means.

21. An arrangement according to claim 20, wherein means are provided for straightening the stuffed casing.

22. An arrangement according to claim 21, wherein said last mentioned means includes a means for selectively engaging said second roller means when the continuous band casing is diposed thereat, and pneumatic means operatively connected with said last-mentioned means for causing said selective engaging.

23. An arrangement for the automatic production of stuffed meats in a continuous band casing comprising:
a meat extruder having a filling nozzle means;
a casing supply means;
carrier means for carrying at least a portion of the continuous band casing from said supply means to said filling nozzle means;
means for selectively advancing said carrier means toward said filling nozzle means;
means provided on said carrier means for spreading an open end of the continuous band casing on said filling nozzle means when said carrier means is disposed adjacent said filling nozzle means;
means provided on said carrier means for selectively maintaining said casing thereon as said carrier means is advanced toward said filling nozzle means;
means on said filling nozzle means for selectively holding said casing thereon; and
means for automatically closing and cutting the continuous band casing into a cased stuffed meat;
said carrier means is constructed of paramagnetic material, said means for selectively maintaining said casing on said carrier means includes a magnetic means disposed proximate to said carrier means, said means for selectively advancing said carrier means includes a transmission linkage operatively connected with said magnetic means.

24. An arrangement according to claim 23, wherein said transmission linkage includes a chain drive.

25. A method for the automatic production of stuffed meat, comprising the steps of:
providing a continuous band casing;
disposing a portion of said band casing on a reciprocating carrier;
transporting said carrier toward a filling nozzle of a meat extruder;
providing a head member reciprocably mounted in said carrier means;
displacing said head member relative to said carrier means by engagement with said filling nozzle means to spread said casing over the filling nozzle;
extruding a predetermined quantity of meat through the filling nozzle into said casing;
closing the ends of said casing; and
cutting the closed casing away from said continuous band casing.

26. An arrangement for the automatic production of stuffed meats in a continuous band casing comprising:
a meat extruder having a filling nozzle means;
a casing supply means;
carrier means for carrying at least a portion of the continuous band casing from said supply means to said filling nozzle means;
means for selectively advancing said carrier means toward said filling nozzle means;
means for spreading an open end of the continuous band casing on said filling nozzle means when said carrier means is disposed adjacent said filling nozzle means;
means for selectively maintaining said casing on said carrier means as said carrier means is advanced toward said filling nozzle means including at least one support means disposed on said carrier means, an arm means pivotally mounted on said support means, said arm means including a toothed means on one end thereof selectively engageable with the casing, the other end of said arm means being provided with a roller means; and
a cam means provided along the path of advancement of said carrier means engageable with said roller means on said arm means to cause selective displacement of the same whereby said toothed means is brought into selective engagement with the casing.

27. An arrangement for the automatic production of stuffed meats in a continuous band casing comprising:
a meat extruder having a filling nozzle means;
a casing supply means;
carrier means for carrying at least a portion of the continuous band casing from said supply means to said filing nozzle means, said carrier means being constructed of paramagnetic material;
means for selectively maintaining said casing on said carrier means including a magnetic means disposed proximate to said carrier means;
means for selectively advancing said carrier means toward said filling nozzle means including a transmission linkage operatively connected with said magnetic means; and
means provided on said carrier means for spreading an open end of the continuous band casing on said filling nozzle means when said carrier means is disposed adjacent said filling nozzle means.

* * * * *